United States Patent
Walch et al.

(10) Patent No.: US 6,334,292 B1
(45) Date of Patent: Jan. 1, 2002

(54) BELT TENSIONER

(75) Inventors: Martin Walch, Dettwiller; Bernard Wattron, Haegen, both of (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/573,831

(22) Filed: May 18, 2000

(30) Foreign Application Priority Data

May 26, 1999 (FR) .............................. 99 06746

(51) Int. Cl.[7] .............................................. A01D 69/00
(52) U.S. Cl. ...................................... 56/11.6; 56/10.2 R
(58) Field of Search .......................... 56/10.2 R, 10.3, 56/10.8, 11.6, 153, 157, 14.7, 15.3; 474/101, 133, 135

(56) References Cited

U.S. PATENT DOCUMENTS

| | | | |
|---|---|---|---|
| 489,323 A | * | 1/1893 | Noble et al. ................. 474/135 |
| 2,519,039 A | * | 8/1950 | George et al. ............... 56/11.6 |
| 2,523,166 A | * | 9/1950 | Tom ............................. 56/11.6 |
| 3,262,330 A | * | 7/1966 | Cheatum ..................... 474/135 |
| 3,982,383 A | * | 9/1976 | Mott .......................... 56/11.6 |
| 4,610,128 A | | 9/1986 | Ermacora |
| 4,669,256 A | | 6/1987 | Ermacora et al. |
| 4,694,640 A | | 9/1987 | Ermacora et al. |
| 4,714,123 A | | 12/1987 | Ermacora et al. |
| 4,719,742 A | | 1/1988 | Ermacora et al. |
| 4,720,964 A | | 1/1988 | Ermacora et al. |
| 4,723,396 A | | 2/1988 | Ermacora |
| 4,763,463 A | | 8/1988 | Ermacora et al. |
| 4,771,591 A | | 9/1988 | Ermacora |
| 4,811,553 A | | 3/1989 | Ermacora et al. |
| 4,833,868 A | | 5/1989 | Ermacora et al. |
| 4,848,069 A | | 7/1989 | Ermacora et al. |
| 4,947,629 A | | 8/1990 | Ermacora et al. |
| 4,986,064 A | | 1/1991 | Ermacora |
| 4,991,383 A | | 2/1991 | Ermacora |
| 5,012,632 A | | 5/1991 | Kuhn et al. |
| 5,060,462 A | | 10/1991 | Helfer et al. |
| 5,094,063 A | | 3/1992 | Wattron et al. |
| 5,107,663 A | | 4/1992 | Wattron et al. |
| 5,136,828 A | | 8/1992 | Ermacora |
| 5,199,249 A | | 4/1993 | Wattron et al. |
| 5,199,250 A | | 4/1993 | Ermacora et al. |
| 5,199,502 A | * | 4/1993 | Hirata et al. ................. 56/11.6 |
| 5,286,233 A | * | 2/1994 | Engelstad et al. ........... 474/101 |
| 5,357,737 A | | 10/1994 | Ermacora |
| 5,417,042 A | | 5/1995 | Walch et al. |
| 5,423,165 A | | 6/1995 | Walch et al. |
| 5,507,136 A | | 4/1996 | Walch |
| 5,522,208 A | | 6/1996 | Wattron |

(List continued on next page.)

FOREIGN PATENT DOCUMENTS

| | | | |
|---|---|---|---|
| DE | 27 07 030 | | 8/1978 |
| DE | 3915227 | * | 12/1989 |
| EP | 0 291 254 | | 11/1988 |
| FR | 2 317 869 | | 2/1977 |
| JP | 2001-3999 | * | 1/2001 |

Primary Examiner—Thomas B. Will
Assistant Examiner—Nathan Mammen
(74) Attorney, Agent, or Firm—Oblon, Spivak, McClelland, Maier & Neustadt, P.C.

(57) ABSTRACT

A device and an agricultural machine which employ a method for the mounting/disassembly and automatic tension adjustment of at least one endless transmission member. The device for the mounting/disassembly and automatic tension adjustment of the endless transmission member is fitted in such a way that an action generated by a spiral spring acts on a second bearing with a lever arm with respect to a geometric axis of an articulation connecting the second bearing to a bearing structure which increases once the spiral spring relaxes.

20 Claims, 6 Drawing Sheets

U.S. PATENT DOCUMENTS

| | | |
|---|---|---|
| 5,660,032 A | 8/1997 | Neuerburg et al. |
| 5,749,390 A | 5/1998 | Ermacora et al. |
| 5,769,747 A * | 6/1998 | Kuhn et al. .................. 474/135 |
| 5,794,424 A | 8/1998 | Ermacora et al. |
| 5,797,251 A * | 8/1998 | Busboom ..................... 56/11.6 |
| 5,852,921 A | 12/1998 | Neuerburg et al. |
| 5,857,314 A | 1/1999 | Wolff |
| 5,901,533 A | 5/1999 | Ermacora et al. |
| 5,901,537 A | 5/1999 | Walch et al. |
| 5,902,202 A * | 5/1999 | Guerra ....................... 474/133 |
| 5,966,913 A | 10/1999 | Neuerburg |
| 5,992,133 A | 11/1999 | Walch et al. |
| 6,003,291 A | 12/1999 | Ermacora et al. |
| 6,055,800 A | 5/2000 | Walch |

\* cited by examiner

BELT TENSIONER

BACKGROUND OF THE INVENTION

1. Field of the Invention

The present invention relates to the technical field of agricultural machinery and in particular to cutting machines.

The invention relates to an agricultural machine comprising:
- a bearing structure,
- a first shaft and a first wheel,
- a second shaft and a second wheel, the axis of rotation of this second shaft being at least approximately parallel to the axis of rotation of the first shaft,
- at least one endless transmission member wrapped around said wheels,
- a first bearing guiding the rotation of the first shaft and fixed to the bearing structure,
- a second bearing guiding the rotation of the second shaft and connected to the bearing structure by means of an articulation, the geometric axis of which is at least approximately parallel to the axis of rotation of the second shaft,
- a device for the mounting/disassembly and automatic tension adjustment of said endless transmission member(s) comprising, in particular, at least one spiral spring and acting on the second bearing so as to tension said endless transmission member(s).

2. Discussion of the Background

An agricultural machine such as this is known from the state of the art (Patent FR 2 317 869) and broadly speaking comprises a cutter bar intended to cut a standing product, and an endless windrowing belt located at one of the ends of said cutter bar and intended to convey product cut by said cutter bar. This windrowing belt is wrapped around two guide cylinders with approximately parallel longitudinal axes. The tension in the endless windrowing belt is adjustable by means of a positioning mechanism which allows one of the two cylinders to move. For this purpose, the positioning mechanism comprises a pivoting lever which at one of its ends supports one of said guide cylinders and which at the other of its ends is subject to the action of a spring, the pressure of which can be adjusted using a nut. This spring is essentially intended to brake the nut and damp out any jerk in the endless windrowing belt.

To ensure good tension in the windrowing belt, the operator acts on the nut, which acts on the spring, which itself tends to cause the pivoting lever to pivot in such a way as to tension the endless windrowing belt. An adjustment device such as this requires frequent and regular checking of the tension in the endless windrowing belt, to ensure that the latter operates correctly.

Also known from the state of the art (DE 27 07 030) is an agricultural machine comprising two pulleys around which a belt equipped with cutting elements is wrapped. One of the pulleys is connected to a chassis by means of a first connection whereas the other pulley is connected to a mobile assembly by means of a second connection, the latter being guided in said chassis. Between the chassis and the mobile assembly there are elastic washers which are intended to move the two pulleys apart so as to tension the belt. This agricultural machine also has a drawback. Specifically, when the operator wishes to remove the belt, he has to bring the two pulleys together, this being an operation which is complicated because there is no device provided to allow such an operation to be performed.

SUMMARY OF THE INVENTION

The object of the present invention aims to overcome the drawbacks of the state of the art.

The object of the present invention therefore aims to produce a cutting machine in which the transmission device requires a minimum amount of maintenance allowing quick intervention on the part of the operator as required for changing worn parts, for example, while at the same time guaranteeing that said transmission device will operate correctly within its limits of use.

Another object of the present invention aims to produce a cutting machine in which the transmission device is simple and inexpensive.

To this end, the objects of the present invention are achieved with the aid of a method for the mounting/disassembly and automatic tension adjustment of one (or more) endless transmission member(s) of an agricultural machine equipped with a bearing structure, which agricultural machine comprises:
- a first shaft and a first wheel,
- a second shaft and a second wheel, the axis of rotation of the second shaft being at least approximately parallel to the axis of rotation of the first shaft,
- said endless transmission member(s) wrapped around said wheels,
- a first bearing guiding the rotation of the first shaft and fixed to the bearing structure,
- a second bearing guiding the rotation of the second shaft and connected to the bearing structure by means of an articulation, the geometric axis of which is at least approximately parallel to the axis of rotation of the second shaft,
- a device for the mounting/disassembly and automatic tension adjustment of said endless transmission member(s) comprising, in particular, at least one spiral spring and acting on the second bearing so as to tension said endless transmission member(s), wherein:
- said device for the mounting/disassembly and automatic tension adjustment of said endless transmission member(s) is fitted in such a way that the action generated by the spiral spring(s) acts on the second bearing with a lever arm with respect to the geometric axis of the articulation connecting the second bearing to the bearing structure which increases once said spiral spring relaxes so that the tension created in the endless transmission member(s) is high enough in the range of permissible values for the elongation of said endless transmission member(s),
- the spiral spring(s) is (are) bended so as to bring the second bearing closer to the first bearing by pivoting about the geometric axis of the articulation connecting the second bearing to the bearing structure,
- said endless transmission member(s) is (are) mounted or said worn endless transmission member(s) is (are) dismounted, then one (or more) new endless transmission member(s) is (are) remounted,
- the spiral spring(s) is (are) released so as to move the second bearing away from the first bearing by pivoting about the geometric axis of the articulation connecting the second bearing to the bearing structure.

The objects of the present invention are also achieved with the aid of a device for the mounting/disassembly and automatic tension adjustment of one (or more) endless transmission member(s) of an agricultural machine equipped with a bearing structure, said device for the mounting/disassembly and automatic tension adjustment of one (or more) endless transmission member(s) moreover comprising:

a first shaft and a first wheel, a second shaft and a second wheel, the axis of rotation of this second shaft being at least approximately parallel to the axis of rotation of the first shaft, said endless transmission member(s) wrapped around said wheels, a first bearing guiding the rotation of the first shaft and fixed to the bearing structure, a second bearing guiding the rotation of the second shaft and connected to the bearing structure by means of an articulation, the geometric axis of which is at least approximately parallel to the axis of rotation of the second shaft, said device for the mounting/disassembly and automatic tension adjustment of said endless transmission member(s) comprising, in particular, at least one spiral spring and acting on the second bearing so as to tension said endless transmission member(s), wherein the device for the mounting/disassembly and automatic tension adjustment of said endless transmission member(s) additionally comprises a telescopic arm comprising a first arm part and a second arm part which are guided in translation one with respect to the other and between which said spiral spring(s) acts (act), the first arm part being connected to the bearing structure and the second arm part being connected to the second bearing at a connection point away from the geometric axis of the articulation connecting the second bearing to the bearing structure, in such a way that said telescopic arm acts on the second bearing with a lever arm which increases as the spiral spring(s) relaxes (relax).

The invention also relates to the following features taken in isolation or in any technically feasible combination:

use is made of one (or more) spiral spring(s) capable of creating tension in the endless transmission member(s), which tension reaches its limit value when said endless transmission member(s) has (have) reached its (their) limit value of elongation;

the telescopic arm additionally comprises a threaded rod, the longitudinal axis of which runs parallel to the longitudinal axis of the telescopic arm, said threaded rod being screwed into one of said arm parts, while the other arm part is guided in translation on said threaded rod along the longitudinal axis thereof, a stop limiting the translational movement of the latter arm part;

said stop is fitted on the threaded rod;

there is another stop on the threaded rod which limits the extent to which the threaded rod can be unscrewed from the arm part into which it is screwed;

said other stop is removable;

the threaded rod is guided in the arm part into which it is screwed, by means of a long guide;

the threaded rod is screwed into the arm part connected to the second bearing;

the telescopic arm is connected to the second bearing by means of an articulation;

the geometric axis of said articulation is at least approximately parallel to the axis of rotation of the second shaft;

the telescopic arm is connected to the bearing structure by means of a pivoting link;

the telescopic arm is connected to the pivoting link by means of an articulation at least approximately parallel to the axis of rotation of the second shaft and said pivoting link is connected to the bearing structure by means of an articulation at least approximately parallel to said axis of rotation of said second shaft;

the pivoting link acts on at least one additional bearing forming part of an endless transmission so as to automatically adjust the tension in the endless transmission member(s) of said endless transmission;

the spiral spring(s) consists (consist) of one (or more) compression spring(s) and the telescopic arm acts on the second bearing by extension;

said endless transmission member(s) consists (consist) of one (or more) belt(s), said first wheel and said second wheel being pulleys.

The present invention also relates to cutting machines, preferably mowers which may or may not be fitted with members for treating the mown product.

BRIEF DESCRIPTION OF THE DRAWINGS

Other objects, features and advantages of the invention will become apparent from the description which follows with reference to the appended drawings which, by way of nonlimiting examples, represent one embodiment of an agricultural machine using the device according to the invention.

In these drawings.

DESCRIPTION OF THE PREFERRED EMBODIMENTS

Figure 1:
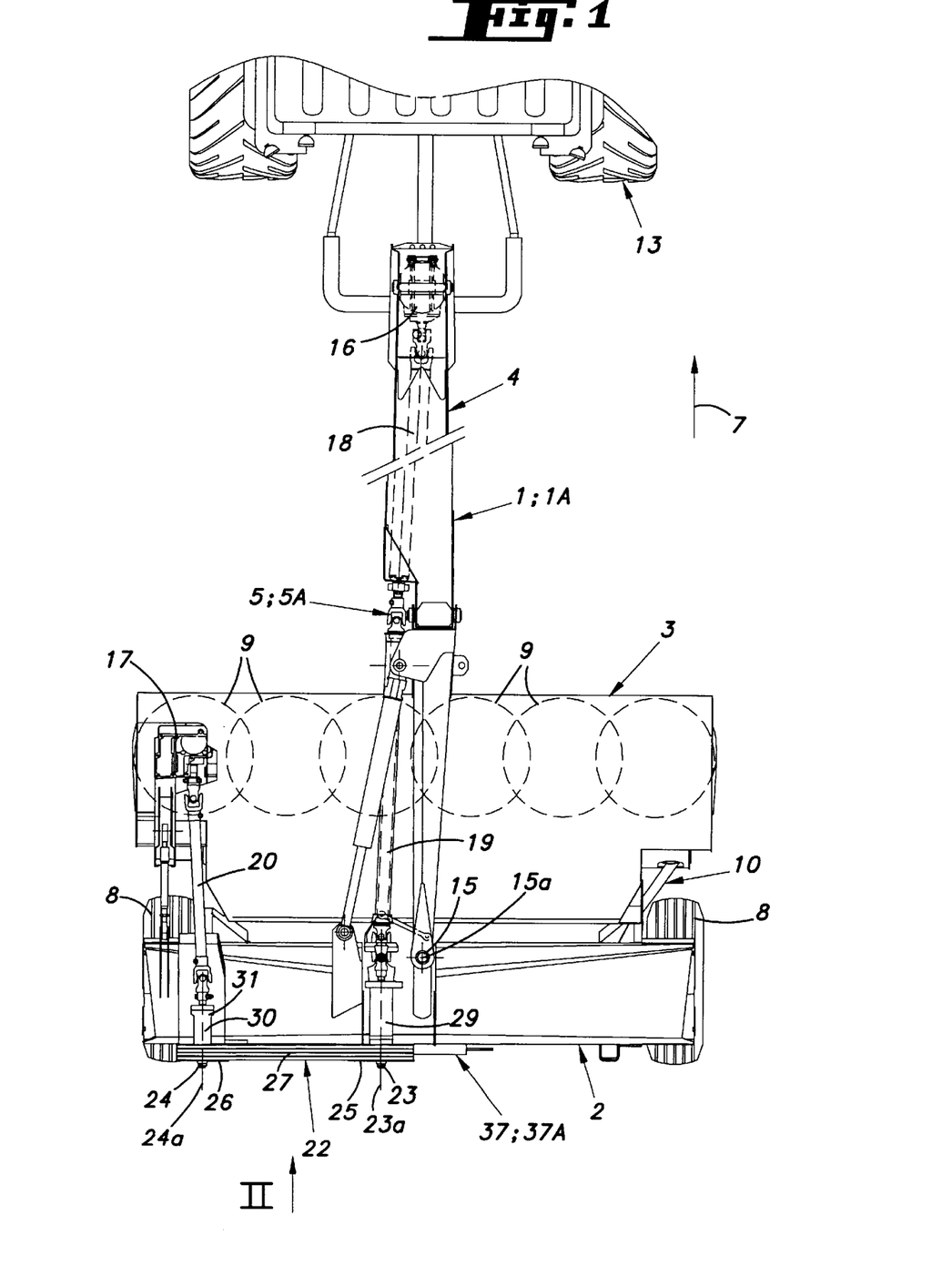
FIG. 1 depicts a mower, viewed from above, comprising a transmission device and a device for implementing the method according to the invention.

The cutting machine 1 depicted in FIG. 1 is, according to the embodiment depicted, a mower which comprises a bearing structure 2, a cutting mechanism 3, a drawbar 4 and a transmission device 5.

The chassis 2, particularly in the work position, runs transversely to the direction of forward travel 7 and, according to the embodiment depicted, comprises two wheels 8 by means of which it can be moved along.

In what follows as the description, the following ideas of "front", "rear", "in front of" and "behind" are defined with respect to the direction of forward travel 7 indicated by the direction of forward travel arrow 7 and the ideas of "right" and "left" are defined when looking at the mower 1 from behind in the direction of forward travel 7.

The cutting mechanism 3 comprises cutting members 9 depicted diagrammatically in FIG. 1 which are intended to cut the standing harvest, and is suspended, movably, from the bearing structure 2 by means of a suspension device 10.

The drawbar 4 for its part is connected, on the one hand, to a tractor vehicle 13 in a way known to the person skilled in the art and, on the other hand, to the bearing structure 2 by means of a first articulation 15 of the pivot type with an at least approximately vertical geometric axis 15a.

The transmission device 5 allows the cutting members 9 of the cutting mechanism 3 to be driven off the tractor vehicle 13. To do this, the transmission device 5 comprises, according to the embodiment depicted, transmission gearboxes 16, 17, cardan transmission shafts 18, 19, 20, and an endless transmission 22.

Figure 2:
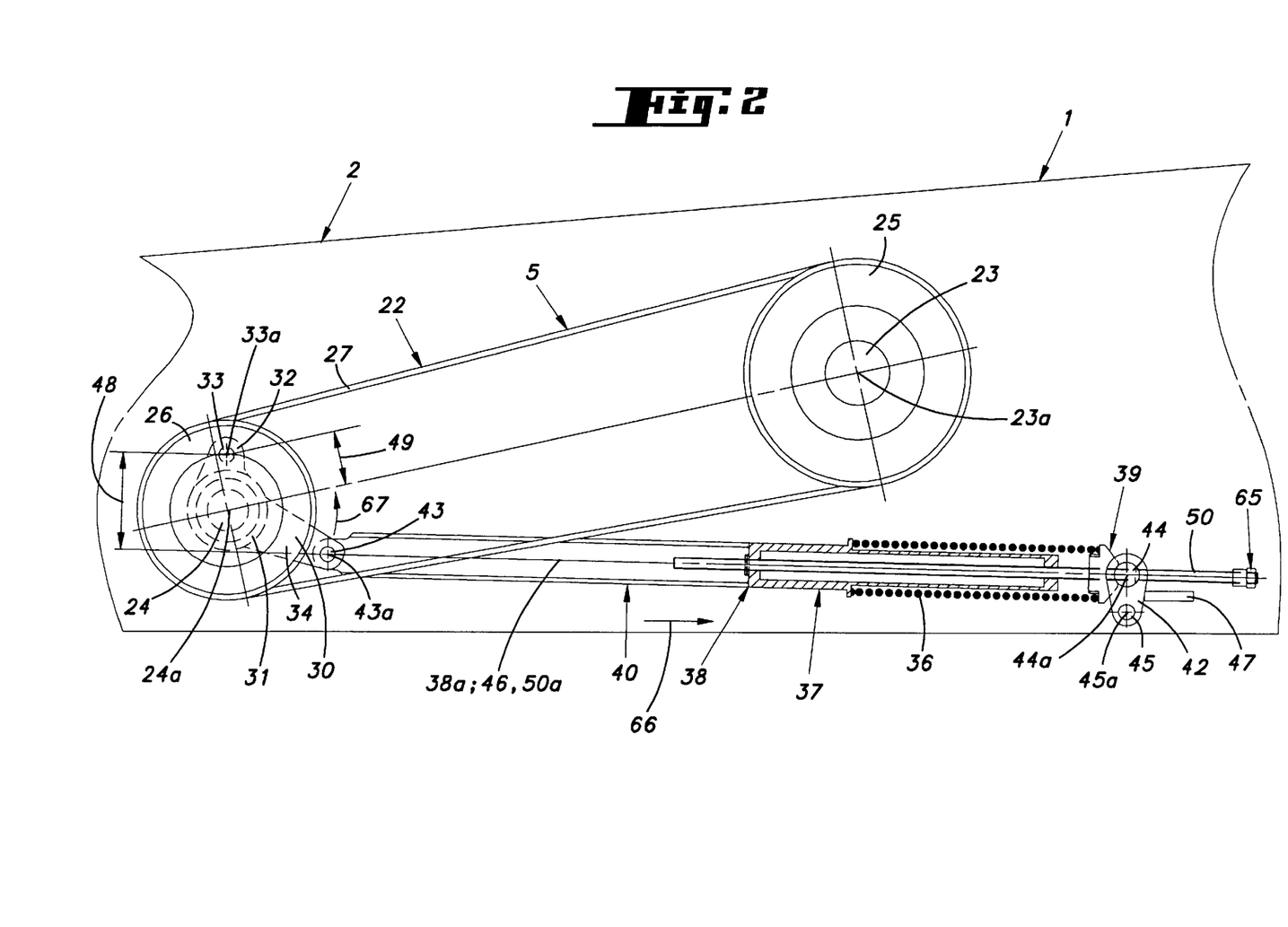
FIG. 2 depicts, on a different scale, a view in the direction of arrow II depicted in FIG. 1, showing the transmission device and the device for implementing the method according to the invention, in a work position according to a first embodiment.
Figure 4:
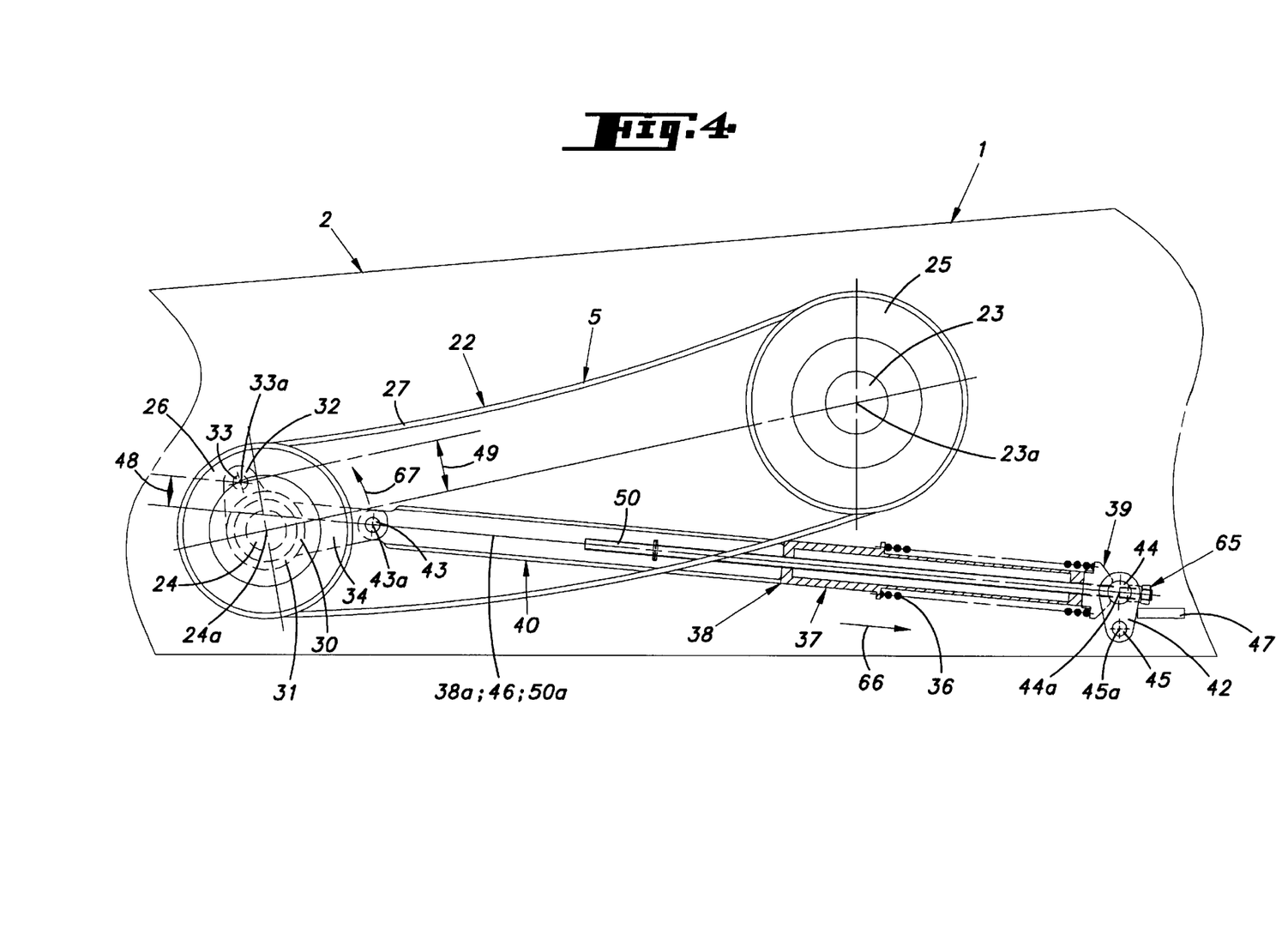
FIG. 4 depicts the transmission device and the device for implementing the method of FIG. 2, in a maintenance position.
Figure 5:
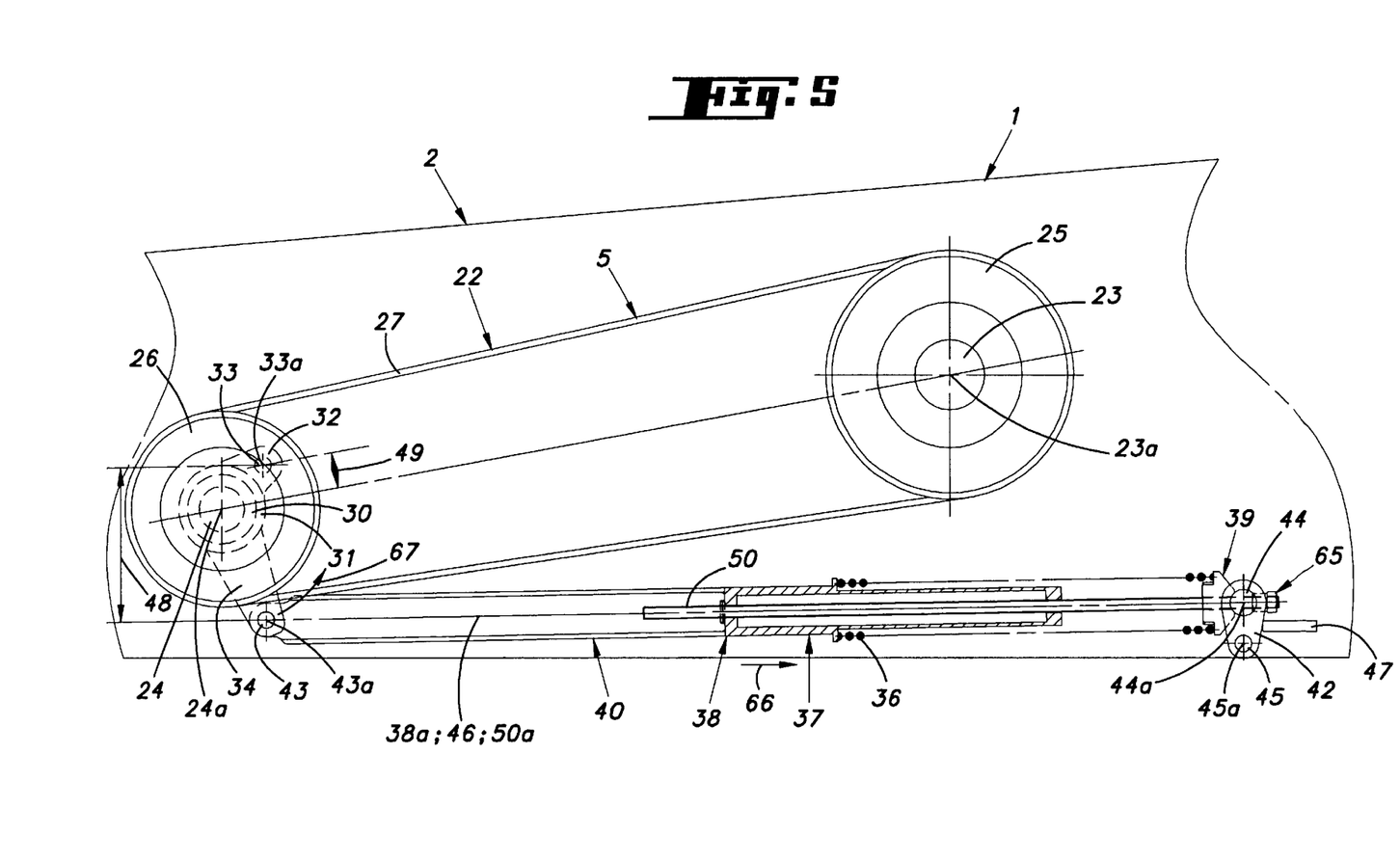
FIG. 5 depicts the transmission device and the device for implementing the method of FIG. 2, in another work position.

From FIGS. 2, 4 and 5 it can be seen that the endless transmission 22 comprises a first shaft 23, the axis of rotation 23a of which is at least approximately horizontal and runs in the direction of forward travel 7, and a second shaft 24, the axis of rotation 24a of which is at least approximately parallel to the axis of rotation 23a of said first shaft 23. The endless transmission 22 further comprises a first wheel 25, a second wheel 26 and endless transmission members 27 wrapped around said wheels 25, 26. These wheels 25, 26 and these endless transmission members 27 consist, in the embodiment depicted, of a first pulley 25, a second pulley 26 and belts 27 wrapped around said pulleys 25, 26.

The first pulley 25 is fixed to the first shaft 23 coaxially and the second pulley 26 is fixed to the second shaft 24, also coaxially.

From FIG. 1 it can further be seen that the first shaft 23 is guided in rotation by a first bearing 29 about its axis of rotation 23a, said first bearing 29 being fixed to the bearing structure 2 of the mower 1. The second shaft 24 is, for its part, guided in rotation by means of a second bearing 30 about its axis of rotation 24a. This second bearing 30 comprises, according to the embodiment depicted, a main barrel 31 in which the second shaft 24 is guided in its rotation, a first arm 32 connected to the bearing structure 2 by means of a second articulation 33, and a second arm 34 on which there acts a spiral spring 36 which forms part of a device 37 for the mounting/disassembly and automatic tension adjustment of the belts 27.

The main barrel 31 runs approximately horizontally in the direction of forward travel 7 while the first arm 32 and the second arm 34 run approximately radially with respect to said main barrel 31. The second articulation 33 connecting the first arm 32 to the bearing structure 2 is of the pivot type and has a geometric axis 33a at least approximately parallel to the axis of rotation 24a of the second shaft 24.

This second articulation 33 advantageously allows the second bearing 30 to pivot about the geometric axis 33a so as to move the second pulley 26 toward or away from the first pulley 25 for mounting or dismounting the belts 27. To do this, the device 37 for the mounting/disassembly and automatic tension adjustment of the belts 27 further comprises a telescopic arm 38 of longitudinal axis 38a. This telescopic arm 38 comprises, according to the embodiment depicted, a first arm part 39 and a second arm part 40 which are guided in translation one with respect to the other and between which the spiral spring 36 acts. This spiral spring 36 consists, according to the embodiment depicted, of a compression spring which tends to move the two arm parts 39, 40 apart so that the telescopic arm 38 tends to lengthen. From FIGS. 2, 4 and 5 it can be seen that the first arm part 39 is connected to the bearing structure 2 via a pivoting link 42 and that the second arm part 40 is connected to the second arm 34 of the second bearing 30 by means of a third articulation 43 of the pivot type and the geometric axis 43a of which is at least approximately parallel to the axis of rotation 24a of the second shaft 24.

The first arm part 39 of the telescopic arm 38 bears against the pivoting link 42 by means of a fourth articulation 44 of the pivot type and the geometric axis 44a of which is at least approximately parallel to the axis of rotation 24a of the second shaft 24. On one hand, the pivoting link 42 is, for its part, connected to the bearing structure 2 by means of a fifth articulation 45 of the pivot type with a geometric axis 45a at least approximately parallel to the axis of rotation 24a of the second shaft 24 and on the other hand bears against a stop 47 fixed to said bearing structure 2.

The spiral spring 36 tends to move the two arm parts 39, 40 apart along a geometric axis 46 passing through the geometric axis 43a of the third articulation 43 and the geometric axis 44a of the fourth articulation 44.

In a particularly advantageous manner, it will be noted that the device 37 for the mounting/disassembly and automatic tension adjustment of the belts 27 is fitted in such a way that the action of the telescopic arm 38 generated by the spiral spring 36 along the geometric axis 46 acts on the second bearing 30 with a first lever arm 48 with respect to the geometric axis 33a of the second articulation 33.

The action of the telescopic arm 38 therefore tends to cause the second bearing 30 to pivot about the geometric axis 33a of the second articulation 33 which has the effect of moving the second pulley 26 away from the first pulley 25 with a second lever arm 49 and of tensioning the belts 27.

As the belts 27 lengthen as a result of wear, the second bearing 30 pivots about the geometric axis 33a of the second articulation 33 and the telescopic arm 38 and the spiral spring 36 lengthen and the force developed by the spiral spring 36 decreases.

For this purpose, to keep optimum tension in the belts 27, the telescopic arm 38, the first pulley 25, the second pulley 26, the second articulation 33 and the third articulation 43 are arranged in such a way that the first lever arm 48 increases as the second bearing 30 pivots about the geometric axis 33a and that the second lever arm 49 decreases so that the tension created in the belts 27 is sufficient within the range of permissible values for the elongation of said belts 27. This phenomenon is perfectly visible in FIGS. 2, 4 and 5.

To achieve this, the third articulation 43 connecting the second arm part 40 of the telescopic arm 38 to the second arm 34 of the second bearing 30 is moved away from the geometric axis 33a of the second articulation 33. It can also be seen that the second shaft 24 carrying the second pulley 26 is moved away from the geometric axis 33a of the second articulation 33.

It will also be noted that the spiral spring 36 is sized so that it creates tension in the belts 27, this tension reaching its limit value when said belts 27 have reached their limit value of elongation. When their limit value for the tension in the belts 27 is reached, these belts slip and no longer provide transmission between the two pulleys 24, 25, which means that said belts 27 have to be changed.

Figure 3:
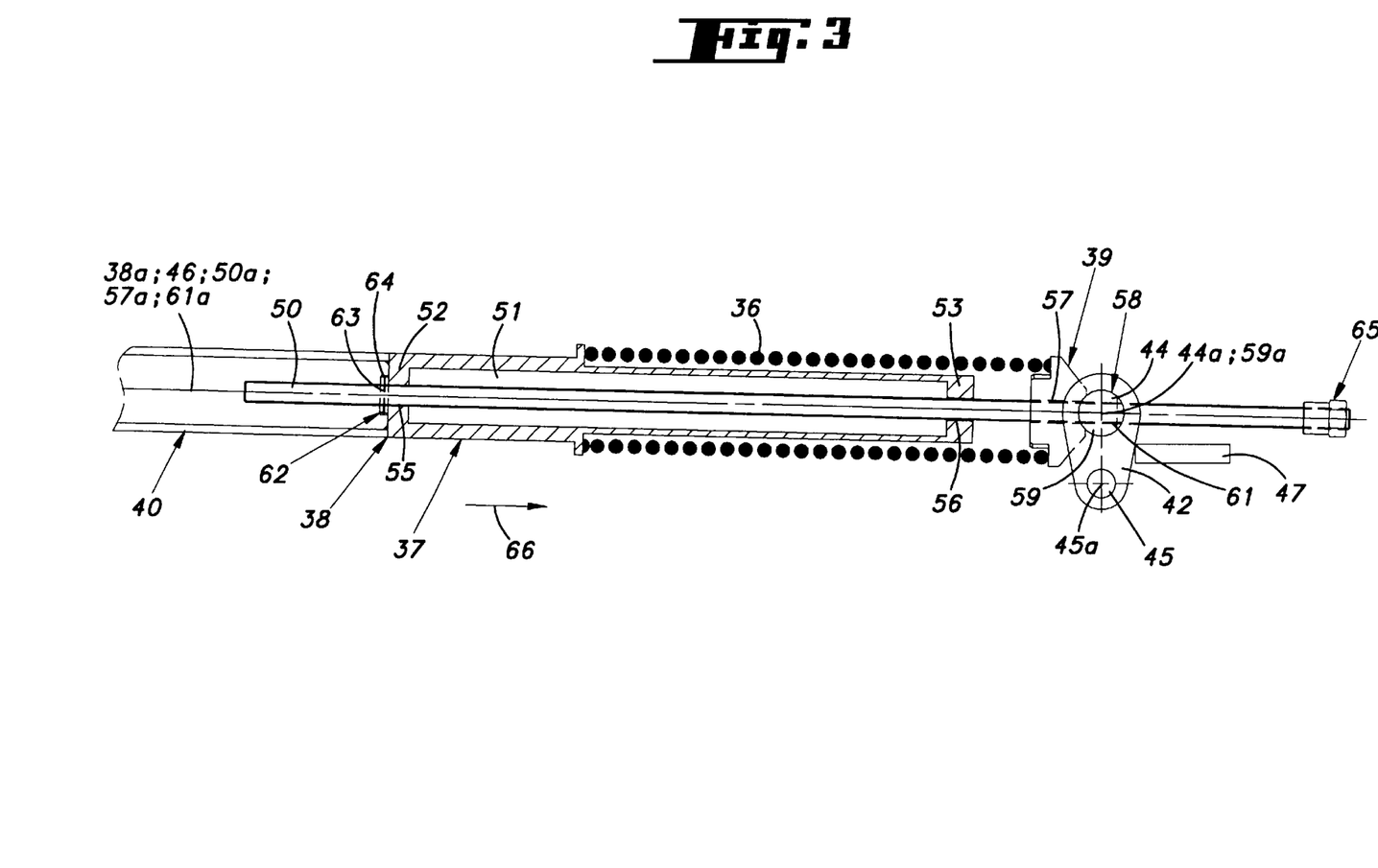
FIG. 3 depicts a partial enlargement of FIG. 2, showing in particular the telescopic arm and the spiral spring of the device for implementing the method according to the invention.

From FIG. 3 it can be seen that the telescopic arm 38 additionally comprises a threaded rod 50 of longitudinal axis 50a which runs approximately parallel to the longitudinal axis 38a of the telescopic arm 38. This threaded rod 50 is, on the one hand, screwed into the second arm part 40 which is connected to the second bearing 30 and, on the other hand, guided in translation in said second arm part 40 by means of a long guide. Specifically, from FIG. 3 it can be seen that the second arm part 40, according to the embodiment depicted, has a hollow part 51 comprising a first sidewall 52 located on the same side as the third articulation 43, and a second sidewall 53 located on the same side as the first arm part 39.

This first sidewall 52 has a tapped hole 55 into which the threaded rod 50 is screwed, while the second sidewall 53 has another hole 56 through which said threaded rod 50 extends.

The first arm part 39 is, for its part, guided in translation on the threaded rod 50 along the longitudinal axis 50a thereof. For this purpose, the first arm part 39 has a longitudinal hole 57, the longitudinal axis 57a of which coincides with the longitudinal axis 50a of the threaded rod 50, through which hole this rod extends.

This first arm part 39 bears, on the one hand, against the spiral spring 36 so as to center the latter and, on the other hand, against a stop 58 which limits the translational movement of said first arm part 39 with respect to the threaded rod 50. According to the embodiment depicted, this stop 58 is made up of a journal 59, the longitudinal axis 59a of which is coincident with the geometric axis 44a of the fourth articulation 44, said journal 59 forming part of this articulation. It can be seen from FIG. 3 that the journal 59 for this purpose has a transverse hole 61, of longitudinal axis 61a, through which the threaded rod 50 extends in sliding fashion.

It will also be noted from FIG. 3 that the stop 58 is fitted on the threaded rod 50. For this purpose, the journal 59 has a transverse hole 61, of longitudinal axis 61a, through which the threaded rod 50 extends in sliding fashion.

It will also be noted that the longitudinal hole 57 of the first arm part 39 and the transverse hole 61 are at least approximately concentric and that their longitudinal axes 57a; 61a are at least approximately coincident with the longitudinal axis 50a of the threaded rod 50.

To prevent the threaded rod 50 from detaching from the second arm part 40, there is another stop 62 on said threaded rod 50, which limits the extent to which this rod can be unscrewed from the tapped hole 55. For this purpose, according to the embodiment depicted, the threaded rod 50 has another transverse hole 63 located near the left-hand end of said threaded rod 50 (FIGS. 2, 3, 4 and 5) and through which an elastic pin 64 extends, this pin being intended to butt against the first sidewall 52. This other stop 62 comprises the elastic pin 64 and is also removable so as to allow the threaded rod 50 to be mounted and dismounted. Specifically, as its name suggests, the elastic pin 64 may be driven from the other transverse hole 63 with the aid of the appropriate tool.

The device 37 for the mounting/disassembly and automatic tension adjustment of the belts 27 works as follows. To mount the belts 27, the second pulley 26 has to be brought as close as possible to the first pulley 25 as depicted in FIG. 4. To do this, the threaded rod 50 is turned in the corresponding direction so that the end 65, located at the right-hand end of said threaded rod 50 (FIG. 4), comes to bear against the journal 59 which then allows the second arm part 40 to move in the direction of a first arrow 66 until said second arm part 40 comes into abutment against the first arm part 39 as depicted in FIG. 4. For this purpose, the spiral spring 36 is tensioned and the second bearing 30 pivots about the geometric axis 33a of the second articulation 33 in the direction of a second arrow 67.

Next, the belts 27 over the pulleys 25, 26 are changed and the spiral spring 36 is released by turning the threaded rod 50 in the opposite direction to allow the second pulley 26 to move away from the first pulley 25 by pivoting about the geometric axis 33a in the opposite direction to the second arrow 67 under the effect of said spiral spring 36. For this purpose, the second arm part 40 moves in the opposite direction to the first arrow 66 until the belts 27 have reached their normal operating tensions under the effect of the spiral spring 36. The operator then continues to turn the threaded rod 50 so that the end 65 of the said threaded rod 50 comes away from the journal 59 until such time as the elastic pin 64 comes to bear against the first sidewall 52 of the second arm part 40 as depicted in FIG. 2.

As the belts 27 gradually wear and become subject to fatigue, they lengthen. Thus, the spiral spring 36 lengthens and the threaded rod 50 slides in the transverse hole 61 in the journal 59 and the longitudinal hole 57 in the first arm part 39 until the end 65 of the threaded rod 50 comes to bear against said journal 59 (FIG. 5). At that moment, the spiral spring 36 has no further effect on the second arm part 40 and the tension in the belts 27 is no longer assured, thus causing said belts 27 to slip and rendering the endless transmission 22 inoperative. At this stage of wear of the belts 27, these belts 27 have to be replaced, as described hereinabove.

It will be noted that this device 37 for the mounting/disassembly and automatic tension adjustment of the belts 27 requires practically no maintenance between the mounting of said belts 27 and their dismounting when they are worn out.

Figure 6:
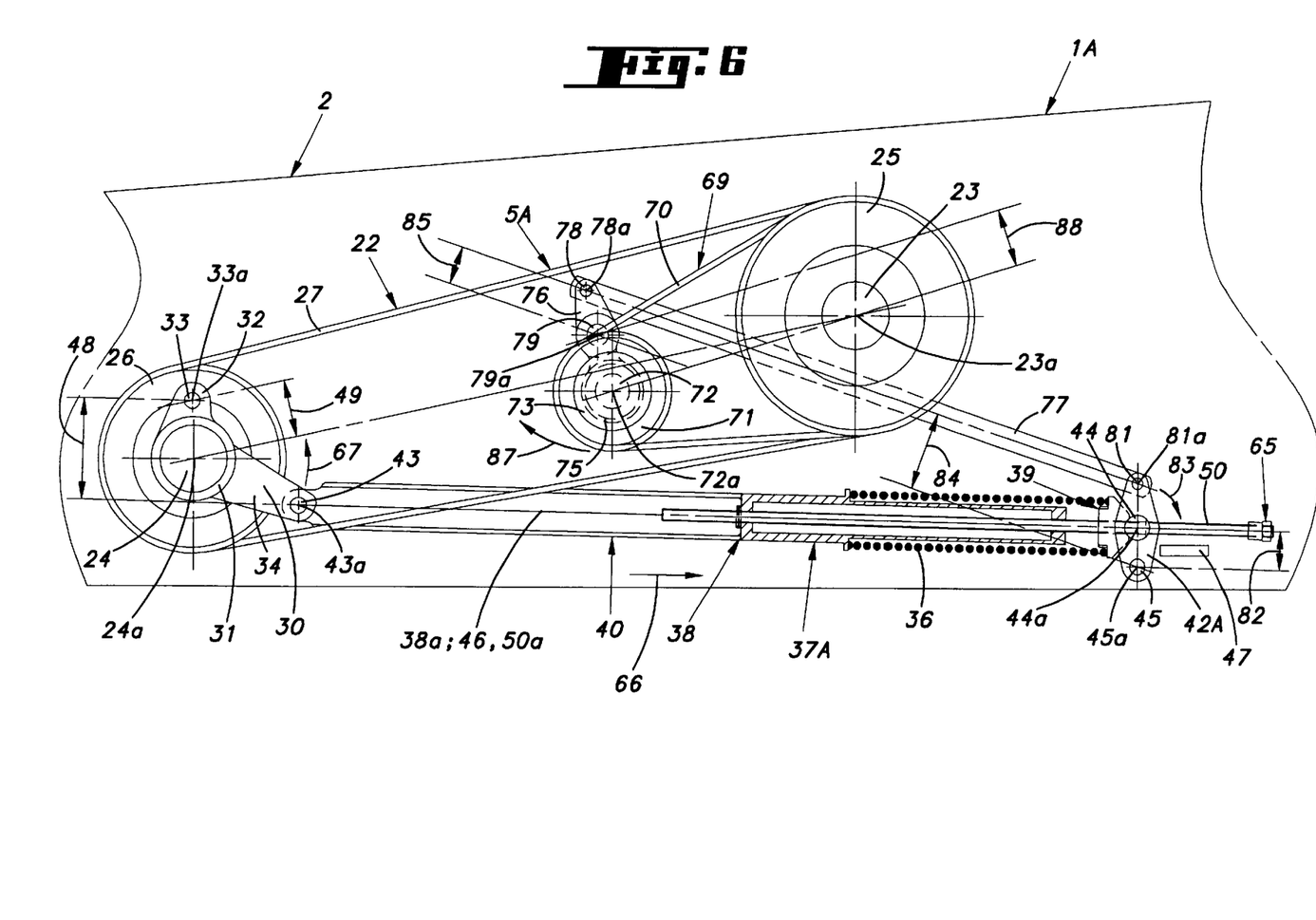
FIG. 6 depicts the transmission device and the device for implementing the method according to the invention, in the work position according to a second embodiment.

FIG. 6 depicts the transmission device 5A and the device for implementing the method according to the invention, in the work position, in a second embodiment. This transmission device 5A comprises a certain number of elements which have already been described. These elements will therefore keep the same reference numerals and will not be described again. They also comprise a certain number of elements which are comparable to elements of the transmission device 5 followed by the letter A. They will be described again only when necessary.

The transmission device 5A according to this second embodiment additionally comprises a second endless transmission 69 comprising another belt 70 and a third pulley 71. This other belt 70 is, according to the embodiment depicted, wrapped around the third pulley 71 and the first pulley 25. The third pulley 71 is fixed coaxially to a third shaft 72, the axis of rotation 72a of which is at least approximately parallel to the axis of rotation 23a of the first shaft 23. From FIG. 6, it can also be seen that the third shaft 72 is guided in rotation by means of a third bearing 73. This third bearing 73 comprises another barrel 75 in which the third shaft 72 is guided in rotation and a third arm 76, to the end of which a connecting rod 77 is connected by means of a connection 78 of the pivot type and the longitudinal axis 78a of which is at least approximately parallel to the axis of rotation 72a. According to the embodiment depicted, this third bearing 73 is connected to the bearing structure 2 by means of a sixth articulation 79 of the pivot type and the longitudinal axis 79a of which is at least approximately parallel to the axis of rotation 23a of the first shaft 23. It will also be noted that the sixth articulation 79 is located between the third shaft 72 and the connection 78, which allows the third bearing 73 to create a lever arm to tension the other belt 70 in the same way as just described hereinabove. For this purpose, it will be noted that the connecting rod 77 is also connected to the pivoting link 42A by means of a seventh articulation 81 of the pivot type and the geometric axis 81a of which is at least approximately parallel to the geometric axis 45a of the fifth articulation 45.

In a particularly advantageous way it will be noted that the connecting rod 77, the third bearing 73 and the pivoting link 42 are arranged in such a way that the action of the telescopic arm 38 acts on said pivoting link 42A with a third lever arm 82 with respect to the geometric axis 45a of the fifth articulation 45. The action of the telescopic arm 38 therefore tends to cause the pivoting link 42 to pivot about the geometric axis 45a of the fifth articulation 45 in the direction of a third arrow 83 and makes it possible to act on the connecting rod 77 with a fourth lever arm 84 as depicted in FIG. 6. For this purpose, the other belt 70 is tensioned by means of the connecting rod 77 which pulls on the third bearing 73 with a fifth lever arm 85. This third bearing 73 tends to pivot about the longitudinal axis 79a of the sixth articulation 79 in the direction of a fourth arrow 87 and therefore allows the third pulley 71 to be moved away from the first pulley 25 with a sixth lever arm 88.

The lever arms 82, 84, 85, 88 of this second endless transmission 69 are sized so that when the other belt 70 lengthens and the force developed by the spiral spring 36 decreases, the tension created in said other belt 70 is sufficient within the range of permissible values for the elongation of said other belt 27.

According to this second embodiment, the pivoting link 42A is controlled by the telescopic arm 38 and acts on the other belt 70 via the connecting rod 77, the third bearing 73 and the third pulley 71 so as also to automatically adjust the tension in said other belt 70.

As the other belt 70 wears and becomes subject to fatigue, it lengthens. Thus, the spiral spring 36 and the telescopic arm 38 behave in the same way as was described previously. When the tension in the other belt 70 is no longer assured, the operator acts on the threaded rod 50 in the same way as was described hereinabove to replace the other belt 70 and possibly the belts 27. Specifically, by acting on the threaded rod 50, the spiral spring 36 no longer acts on the pivoting link 42A and the second pulley 26, just like the third pulley 71, can be moved closer to the first pulley 25 with a view to replacing the belts 27; 70. Thus, using just one spiral spring 36 and just one telescopic arm 38 it becomes possible to automatically adjust the tension in the belts 27; 70 of two endless transmissions 22; 69 and to mount and dismount said belts 27; 70 with practically no other maintenance between said mounting and said dismounting operations.

From FIG. 6, it can also be seen that in this normal work position, the pivoting link 42A does not bear against the stop 47.

It will also be noted that the spiral spring 36 in these two embodiments is also able to damp out any jerk of the belts 27; 70 of the transmissions 22; 69.

Finally, various modifications can be made to the examples which have just been described, particularly as regards the construction of the various elements or by substitution of technical equivalents, without thereby departing from the field of protection.

Thus, for example, it is possible to equip the mower 1; 1A with a device for treating forage, equipped with treatment members intended to treat the product mown by the cutting members 9 of the cutting mechanism 3.

It is also perfectly possible to equip the mower 1; 1A with a number of transmission devices each comprising an endless transmission device, it then being possible each to be controlled by just one device 37 for the mounting/disassembly and automatic tension adjustment of the endless transmission members of the endless transmission device.

What is claimed as new and desired to be secured by Letters Patent of the United States is:

1. A method for mounting/disassembly and automatic tension adjustment of at least one endless transmission member of an agricultural machine equipped with a bearing structure, the agricultural machine including a first shaft and a first wheel, a second shaft and a second wheel, an axis of rotation of the second shaft being at least approximately parallel to an axis of rotation of the first shaft, said endless transmission member wrapped around said first wheel and said second wheel, a first bearing guiding a rotation of the first shaft and fixed to the bearing structure, a second bearing guiding a rotation of the second shaft and connected to the bearing structure by an articulation having a geometric axis which is at least approximately parallel to the axis of rotation of the second shaft, said method comprising the steps of:

providing a device for mounting/disassembly and automatic tension adjustment of said endless transmission member, said device for mounting/disassembly and automatic tension adjustment including at least one spiral spring positioned to act on the second bearing so as to tension said endless transmission member and a telescopic arm including a first arm part and a second arm part which are guided in translation one with respect to the other and between which said at least one spiral spring acts, the first arm part being connected to the bearing structure and the second arm part being connected to the second bearing at a connection point away from the geometric axis of the articulation connecting the second bearing to the bearing structure, in such a way that said telescopic arm acts on the second bearing with a lever arm which increases as the at least one spiral spring relaxes;

fitting said device for mounting/disassembly and automatic tension adjustment in such a way that an action generated by the at least one spiral spring acts on the second bearing with a lever arm with respect to the geometric axis of the articulation connecting the second bearing to the bearing structure which increases once said at least one spiral spring relaxes so that a tension created in the endless transmission member is high enough in a range of permissible values for an elongation of said endless transmission member;

tensioning said at least one spiral spring so as to bring the second bearing closer to the first bearing by pivoting about the geometric axis of the articulation connecting the second bearing to the bearing structure;

mounting said endless transmission member;

dismounting a worn endless transmission member and remounting a new endless transmission member; and releasing the at least one spiral spring so as to move the second bearing away from the first bearing by pivoting about the geometric axis of the articulation connecting the second bearing to the bearing structure.

2. A method as claimed in claim 1, wherein said at least one spiral spring comprises at least one spiral spring capable of creating tension in the endless transmission member, and said at least one spiral spring having a tension which reaches a limit value once said endless transmission member has reached a limit value of elongation.

3. A device for mounting/disassembly and automatic tension adjustment of at least one endless transmission member of an agricultural machine equipped with a bearing structure, said agricultural machine including a first shaft and a first wheel, a second shaft and a second wheel, said second shaft having an axis of rotation at least approximately parallel to an axis of rotation of the first shaft, an endless transmission member wrapped around said first wheel and said second wheel, a first bearing guiding a rotation of the first shaft and fixed to the bearing structure, a second bearing guiding a rotation of the second shaft and connected to the bearing structure by an articulation having a geometric axis which is at least approximately parallel to the axis of rotation of the second shaft, said device for mounting/disassembly and automatic tension adjustment comprising:

at least one spiral spring positioned to act on the second bearing so as to tension said endless transmission member; and a telescopic arm including a first arm part and a second arm part which are guided in translation one with respect to the other and between which said at least one spiral spring acts, the first arm part being connected to the bearing structure and the second arm part being connected to the second bearing at a connection point away from the geometric axis of the articulation connecting the second hearing to the bearing structure, in such a way that said telescopic arm acts on the second bearing with a lever arm which increases as the at least one spiral spring relaxes.

4. A device as claimed in claim 3, wherein the telescopic arm additionally comprises a threaded rod, a longitudinal axis of which runs parallel to a longitudinal axis of the telescopic arm, said threaded rod being screwed into one of said arm parts, while the other arm part is guided in translation on said threaded rod along the longitudinal axis thereof, a stop limiting a translational movement of the latter arm part.

5. A device as claimed in claim 4, wherein said stop is fitted on the threaded rod.

6. A device as claimed in claim 4, wherein a second stop is provided on the threaded rod which limits the extent to which the threaded rod is unscrewed from the arm part.

7. A device as claimed in claim 6, wherein said second stop is removable.

8. A device as claimed in claim 4, wherein the threaded rod is guided in the arm part by a long guide.

9. A device as claimed in claim 4, wherein the threaded rod is screwed into the arm part connected to the second bearing.

10. A device as claimed in claim 3, wherein the telescopic arm is connected to the second bearing by an articulation.

11. A device as claimed in claim 10, wherein a geometric axis of said articulation is at least approximately parallel to an axis of rotation of the second shaft.

12. A device as claimed in claim 3, wherein the telescopic arm is connected to the bearing stricture by a pivoting link.

13. A device as claimed in claim 12, wherein the telescopic arm is connected to the pivoting link by an articulation at least approximately parallel to the axis of rotation of the second shaft and wherein said pivoting link is connected to the bearing structure by an articulation at least approximately parallel to said axis of rotation of said second shaft.

14. A device as claimed in claim 12, wherein the pivoting link acts on at least one additional bearing forming part of an endless transmission so as to automatically adjust the tension of the endless transmission member.

15. A device as claimed in claim 3, wherein the at least one spiral spring comprises at least one compression spring and the telescopic arm acts on the second bearing by extension.

16. A device as claimed in claim 3, wherein said endless transmission member comprises at least one belt, and said first wheel and said second wheel are pulleys.

17. An agricultural machine comprising:

a bearing structure;

a first shaft and a first wheel;

a second shaft and a second wheel, said second shaft having an axis of rotation at least approximately parallel to an axis of rotation of the first shaft;

at least one endless transmission member wrapped around said first wheel and said second wheel;

a first bearing guiding a rotation of the first shaft and fixed to the bearing structure;

a second bearing guiding a rotation of the second shaft and connected to the bearing structure by an articulation, a geometric axis of which is at least approximately parallel to the axis of rotation of the second shaft; and a device for mounting/disassembly and automatic tension adjustment of said endless transmission member, said device for mounting/disassembly and automatic tension adjustment including at least one spiral spring positioned to act on the second bearing so as to tension said endless transmission member, and a telescopic arm including a first arm part and a second arm part which are guided in translation one with respect to the other and between which said at least one spiral spring acts, the first arm part being connected to the bearing structure and the second arm palt being, connected to the second bearing at a connection point away from the geometric axis of the articulation connecting the second bearing to the bearing structure, in such a way that said telescopic arm acts on the second bearing with a lever arm which increases as the at least one spiral spring relaxes.

18. An agricultural machine as claimed in claim 17, wherein said agricultural machine is a cutting machine.

19. An agricultural machine as claimed in claim 18, wherein said agricultural machine is a mower.

20. An agricultural machine as claimed in claim 19, wherein said agricultural machine is a mower equipped with members for treating a mown product.

* * * * *